Figure 1:
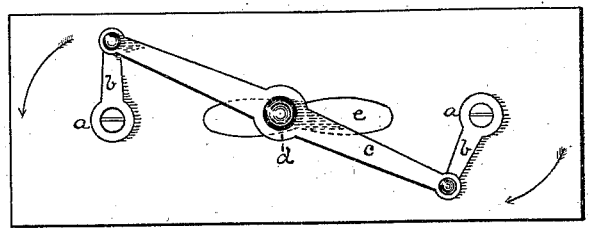
Figure 2:
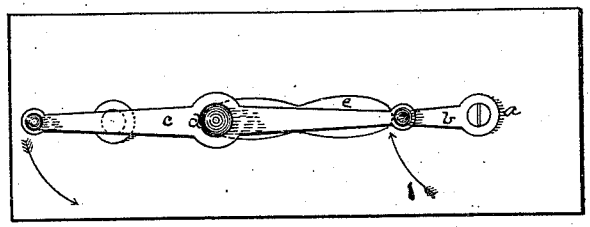
Figure 3:
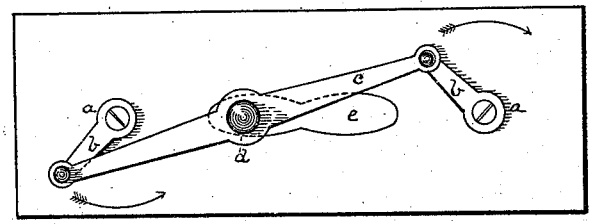
Figure 4:
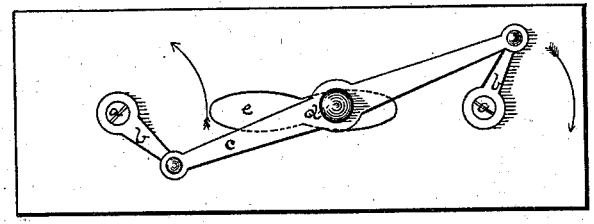

J. R. FINNEY.
MECHANICAL-MOVEMENT.

No. 173,930.  Patented Feb. 22, 1876.

Witnesses  
James D. Hay  
R. C. Wrenshall

Inventor  
Joseph R. Finney  
by Bakewell & Kerr  
Attys

UNITED STATES PATENT OFFICE.

JOSEPH R. FINNEY, OF PITTSBURG, PENNSYLVANIA.

IMPROVEMENT IN MECHANICAL MOVEMENTS.

Specification forming part of Letters Patent No. 173,930, dated February 22, 1876; application filed November 23, 1875.

*To all whom it may concern:*

Be it known that I, JOSEPH R. FINNEY, of Pittsburg, in the county of Allegheny and State of Pennsylvania, have invented a new and useful Improvement in Mechanical Movement; and I do hereby declare the following to be a full, clear, and exact description thereof, reference being had to the accompanying drawing, forming a part of this specification, in which—

The several figures, from 1 to 4, illustrate my invention, the arrows indicating the direction in which the shafts revolve.

My invention relates to a mechanical movement for transmitting power from shaft to shaft, whereby a reverse motion of the shafting may be obtained without the use of belts or gearing; and it consists in connecting the shafts off their axial centers by means of a pitman guided by ways or a slot arranged between the shafting.

In the drawing, *a a* indicate shafting, each provided with a crank-arm, *b*, which gives attachment to the pitman *c* that connects the shafting. The pitman *c* is provided at or near its middle with a pin, *d*, traveling in a slot, *e*, formed in the frame-work of a machine, or specially provided for when the shafting is not journaled in a frame. This slot *e* acts as a guide to change the direction of the pitman, and may be made by joining two ovals, as shown, the outlines of which represent the path through which a point upon the pitman midway between the points of attachment to the shafting travels when the shafts are revolving in opposite directions. An anti-friction roller may be used upon the pin *d*, if desired. The slot *e* is shown as made on a line passing through the axes of the shafts, the curved sides of the slot serving to give support to the pitman, but said curves are not absolutely necessary. This mechanical movement is especially adapted to connect the feeding devices of nail-machines, to which it has been applied by me, but is capable of useful employment in numerous other instances where a compact mechanism for transmitting power and obtaining reverse motion is desired, and where bolts and cog or bevel gearing are objectionable.

I am aware that motion has been transferred from one shaft to another by means of a connecting-lever, slotted at the middle and at one end longitudinally to play upon a fixed pin, and lay no claim thereto, said devices being productive of irregular motion on the shafts and of dead-centers, while in my invention the length of lever is positive and the fulcrum changeable, so as to avoid dead-centers and obtain uniform motion.

Having thus described my invention, I claim—

In combination with two shafts, a pitman connected to the shafts at a point outside the axial centers, and moving in guides, inclined or cam-shaped, substantially as and for the purpose specified.

In testimony whereof I, the said JOSEPH R. FINNEY, have hereunto set my hand.

JOSEPH R. FINNEY.

Witnesses:
JAMES BLACK,
W. J. MATHEWS.